(12) United States Patent
Böhm et al.

(10) Patent No.: US 11,811,267 B2
(45) Date of Patent: Nov. 7, 2023

(54) STATOR PLATE PACKET WITH WELD SEAMS RUNNING OBLIQUELY TO ROTATIONAL AXIS

(71) Applicant: Valeo Siemens eAutomotive Germany GmbH, Erlangen (DE)

(72) Inventors: Andreas Böhm, Erlangen (DE); Michael Müller, Bad Neustadt a.d.Saale (DE)

(73) Assignee: Valeo Siemens eAutomotive Germany GmbH, Erlangen (DE)

( * ) Notice: Subject to any disclaimer, the term of this patent is extended or adjusted under 35 U.S.C. 154(b) by 0 days.

(21) Appl. No.: 17/465,190

(22) Filed: Sep. 2, 2021

(65) Prior Publication Data
US 2022/0069642 A1    Mar. 3, 2022

(30) Foreign Application Priority Data
Sep. 3, 2020 (DE) ..................... 10 2020 211 144.8

(51) Int. Cl.
*H02K 1/16*     (2006.01)
*H02K 1/22*     (2006.01)
*H02K 7/14*     (2006.01)

(52) U.S. Cl.
CPC ................. *H02K 1/16* (2013.01); *H02K 1/22* (2013.01); *H02K 7/14* (2013.01)

(58) Field of Classification Search
CPC .. H02K 1/16; H02K 1/22; H02K 7/14; H02K 2201/06
(Continued)

(56) References Cited

U.S. PATENT DOCUMENTS

| 4,687,960 A | 8/1987 | Frister |
| 4,933,584 A * | 6/1990 | Harms ................... H02K 1/278 310/156.47 |

(Continued)

FOREIGN PATENT DOCUMENTS

| DE | 10012849 A1 | 12/2000 |
| GB | 2037093 A | 7/1980 |
| JP | 2006-217718 A | 8/2006 |

OTHER PUBLICATIONS

German Search report in corresponding German Application No. 10 2020 211 144.8, dated Nov. 6, 2021 (9 pages).
(Continued)

*Primary Examiner* — Michael Andrews
(74) *Attorney, Agent, or Firm* — Osha Bergman Watanabe & Burton LLP

(57) ABSTRACT

A stator plate packet (7, 7a, 7b) for a stator (5) of an electrical machine (1) is described, which comprises several stator plates (6) stacked one against the other and with stator grooves (13) open towards the inside for receiving a stator winding (8), wherein the stator plates (6) are welded together by means of a plurality n of external weld seams (14) or weld seam portions which are evenly distributed over the periphery of the stator plate packet (7, 7a, 7b). The weld seams (14) or weld seam portions each run from a first end face (B) of the stator plate packet (7) to a second end face (C) of the stator plate packet (7) and each extend over an angle ($\alpha$) with respect to the rotational axis (A) of the electrical machine (1). The angle ($\alpha$) lies in a range of $\alpha \geq 360°/n - 10\%$. Furthermore, an electrical machine (1) with such a stator plate packet (7, 7a, 7b) or stator (4), and a vehicle (15) with such an electrical machine (1), are described.

9 Claims, 2 Drawing Sheets

(58) Field of Classification Search
USPC .................................................. 310/216.001
See application file for complete search history.

(56) References Cited

U.S. PATENT DOCUMENTS

| | | | | |
|---|---|---|---|---|
| 6,246,142 | B1* | 6/2001 | Asao | ........................ H02K 1/16 |
| | | | | 310/216.136 |
| 2004/0195926 | A1* | 10/2004 | Hiwaki | .................. H02K 1/146 |
| | | | | 310/214 |
| 2011/0248598 | A1* | 10/2011 | Utaka | .................. H02K 15/024 |
| | | | | 310/216.009 |

OTHER PUBLICATIONS

Extended European Search Report in corresponding European Application No. 21194415.2, dated Jan. 14, 2022 (8 pages).

* cited by examiner

STATOR PLATE PACKET WITH WELD SEAMS RUNNING OBLIQUELY TO ROTATIONAL AXIS

TECHNICAL FIELD

The invention concerns a stator plate packet for a stator of an electrical machine, which comprises several stator plates stacked one against the other and with stator grooves open towards the inside for receiving a stator winding. Furthermore, an electrical machine with such a stator plate packet or with such a stator, and a vehicle with such an electrical machine, are described.

PRIOR ART

In electrical machines, it is known to weld together the stator plates, stacked one against the other, of a stator plate packet, in order to give the stator plate packet stability. Frequently, the weld seams here run parallel to the stator grooves of the stator plate packet. Welding in principle leads to a distortion of the stator plate packet. In concrete terms, sometimes deviations of the central bore of the stator plate packet from the cylindrical form occur, and are such that a very large deviation from the cylindrical form leads to a cross-section with a flower-like pattern. If the weld seams run obliquely or helically, depending on the choice of section plane, there is a twist in this flower-like pattern. Since the deviation from the cylindrical form directly influences the width of the air gap between the stator and rotor, and hence the magnetic forces in operation of the electrical machine, the welding distortion leads to undesired torque fluctuations or an undesired locking moment.

DISCLOSURE OF THE INVENTION

It is therefore an object of the invention to provide an improved stator plate packet, an improved electrical machine, and an improved vehicle with such an electrical machine. In particular, undesired torque fluctuations or an undesired locking moment should be avoided or at least reduced.

The object of the invention is achieved by a stator plate packet for a stator of an electrical machine, comprising several stator plates stacked one against the other and with stator grooves open towards the inside for receiving a stator winding, wherein the stator plates are welded together by means of a plurality n of external weld seams or weld seam portions which are evenly distributed over the periphery of the stator plate packet and each run from a first end face of the stator plate packet to a second end face of the stator plate packet and which each, with respect to the rotational axis of the electrical machine, extend over an angle which lies in a range of $\alpha \geq 360°/n - 10\%$.

The weld seams or weld seam portions thus each run from a first end face of the stator plate packet to a second end face of the stator plate packet and each extend over an angle $\alpha$ with respect to the rotational axis of the electrical machine which lies in a range of $\alpha \geq 360°/n - 10\%$. This means that the weld seams or weld seam portions run in the non-axial direction, and n indicates the number of weld seams or weld seam portions.

The object of the invention is also achieved with an electrical machine which comprises a stator with a stator plate packet of the type cited above, wherein a stator winding is received in the stator grooves of the stator plate packet. The electrical machine furthermore comprises a rotor which is mounted so as to be rotatable relative to the stator about the rotational axis of the rotor.

Finally, the object is also achieved by a vehicle with at least two axles, of which at least one is driven, wherein said drive is provided at least partially or for part of the time by the above-mentioned electrical machine.

By means of the proposed measures, the disadvantages cited initially may be overcome. A welding distortion of the stator plate packet as such indeed cannot be prevented, but in the various sectional planes through the stator plate packet there is a strong twist of the flower-like pattern described initially, which represents a deviation of the central bore of the stator plate packet from the cylindrical form. The pattern present at the first end face should remain approximately congruent with the pattern at the second end face. Any twist between the patterns should be slight. Viewed over the entire length of the stator plate packet, the influences on the magnetic forces in operation of the electrical machine can thereby be balanced. In other words, the influence of the welding distortion on said magnetic forces is "smeared" over the total length of the stator plate packet. Undesired torque fluctuations or an undesired locking moment can thus be avoided or at least significantly reduced.

In particular, the weld seams or weld seam portions may
   i) adjoin one another (radially), wherein the angle $\alpha = 360°/n$, or
   ii) overlap one another (radially), wherein the angle $\alpha > 360°/n$, or
   iii) be slightly spaced apart from one another (radially), wherein the angle $360°/n > \alpha > 360°/n - 10\%$.

Advantageously, the welding is performed with a laser since this method does not apply material and therefore no grooves need be produced for the weld seams.

Further advantageous embodiments and refinements of the invention arise from the subclaims and from the description considered in conjunction with the figures.

It is favourable if the number of weld seams or weld seam portions is uneven and in particular less than a number of stator grooves. In this way, an undesired reinforcement of the deviation of the central bore of the stator plate packet from the cylindrical form, provoked by a correlation of the weld seams with the stator grooves, can be avoided.

It is furthermore favourable if the angle $\alpha$ is uneven and in particular larger than an angle $\beta$, over which a helically running stator groove extends from the first end face of the stator plate packet to the second end face of the stator plate packet (or, in a development of a periphery of the stator plate packet, the stator groove runs along a straight line oriented obliquely to the rotational axis of the electrical machine). In this way, an undesired reinforcement of the deviation of the central bore of the stator plate packet from the cylindrical form, provoked by a correlation of the weld seams with the stator grooves, can also be avoided.

It is furthermore favourable if, in a development of a periphery of the stator plate packet, the weld seams or weld seam portions each run along a straight line oriented obliquely to the rotational axis of the electrical machine or run in an arrow shape or zigzag shape, since these forms are comparatively easy to produce. Viewed spatially, the resulting weld seams or weld seam portions run helically or have helical portions. Straight weld seams do not however necessarily run parallel to one another.

It is also favourable if the stator grooves each run helically (or, in a development of a periphery of the stator plate packet, along a straight line oriented obliquely to the rotational axis of the electrical machine), and a) a turn direction of the helically running weld seams and a turn direction of the helically running stator grooves have the same orientation, or b) a turn direction of the helically running weld seams and a turn direction of the helically running stator grooves have opposite orientations.

In case a), the pattern appearing in the various sectional planes and representing a deviation of the central bore of the stator plate packet from the cylindrical form may be largely identical apart from a twist. In case b), an undesired reinforcement of the deviation of the central bore of the stator plate packet from the cylindrical form, provoked by a correlation of the weld seams with the stator grooves, can be avoided particularly effectively.

It is also favourable if the turn directions of all helically running weld seams have the same orientation. This makes performance of the welding of the stator plate packet particularly simple.

It is also favourable if the number n of weld seams or weld seam portions is even, and a half n/2 of the weld seams have a first turn direction and the other half n/2 of the weld seams have a second, opposite turn direction. By means of these measures, a high degree of symmetry of the welding distortion can be achieved. The weld seams or weld seam portions in this case may in particular run in an arrow shape or zigzag shape.

The above embodiments and refinements of the invention may be combined in arbitrary fashion.

BRIEF DESCRIPTION OF THE FIGURES

Exemplary embodiments of the invention are shown as examples in the appended schematic figures. The drawings show.

DETAILED DESCRIPTION OF THE INVENTION

Initially, it is stated that identical parts in the different embodiments carry the same reference signs or same component designations, but in some cases with different indices. The disclosures of a component contained in the description may accordingly be transferred to another component with the same reference sign or same component designation. Also, the positional data selected in the description, such as e.g. "top", "bottom", "rear", "front", "side" etc. relate to the figure directly described and depicted, and on a position change, should be transferred accordingly to the new position.

Figure 1:
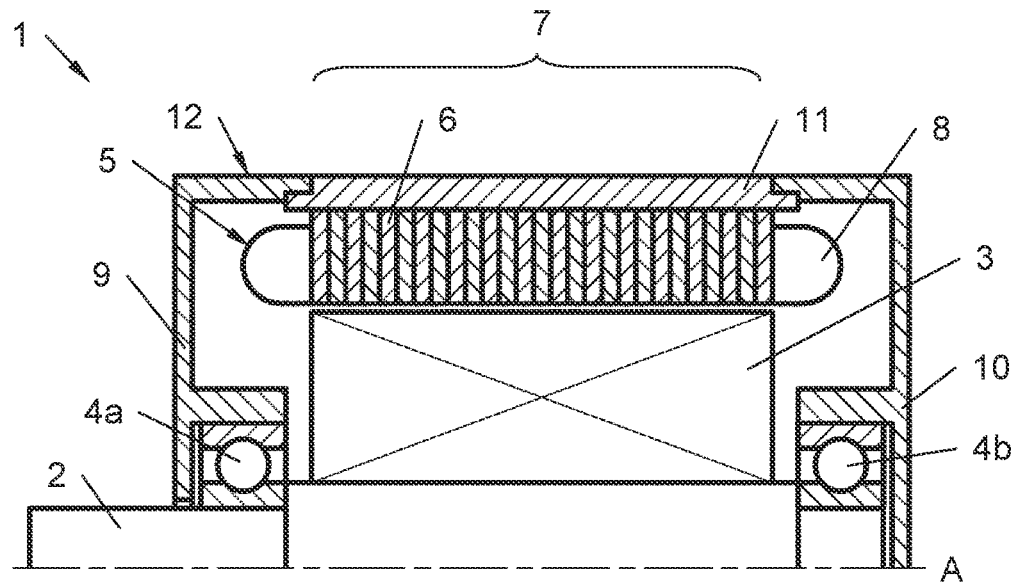
FIG. 1 a schematic half-sectional view of an exemplary electrical machine.

FIG. 1 shows a half section through a schematically depicted electrical machine 1. The electrical machine 1 comprises a shaft 2 with a rotor 3 sitting thereon, wherein the shaft 2 is mounted by means of (roller) bearings 4a, 4b so as to be rotatable about a rotational axis A relative to a stator 5. In this example, the stator 5 has several stator plates 6 which form a stator plate packet 7, and stator windings 8 arranged therein. In concrete terms, the first bearing 4a sits in a front end shield 9, and the second bearing 4b sits in a rear end shield 10. Furthermore, the electrical machine 1 comprises a middle housing part 11 which connects the front end shield 9 and rear end shield 10 and also receives the stator plate packet 7. The front end shield 9, the rear end shield 10 and the housing part 11 in this example thus form the housing 12 of the electrical machine 1.

Figure 2:
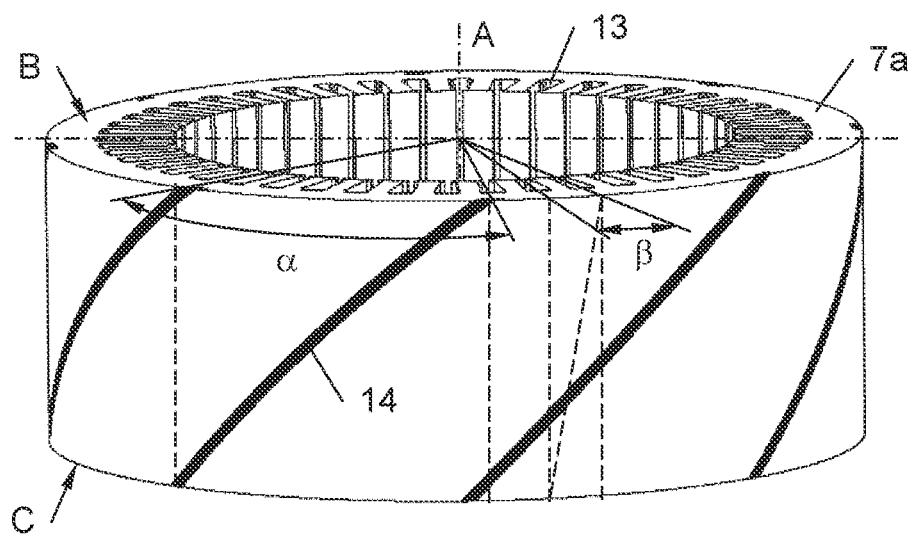
FIG. 2 an oblique view of a stator plate packet welded with straight weld seams.

FIG. 2 now shows an oblique view of an exemplary stator plate packet 7a, in this case without stator windings 8. Therefore the stator grooves 13 opening radially towards the inside are clearly visible.

The stator plates 6 are welded together by a plurality n of external weld seams 14 which are evenly distributed over the periphery of the stator plate packet 7a and run from a first end face B of the stator plate packet 7a to a second end face C of the stator plate packet 7a. The weld seams 14 here each extend over an angle α with respect to the rotational axis A of the electrical machine 1. This means that the weld seams 14 run in the non-axial direction. The angle α here lies in a range of α≥360°/n−10%. Viewed spatially, the weld seams 14 run in a helix and, in a development of a periphery of the stator plate packet 7a, along straight lines oriented obliquely to the rotational axis A of the electrical machine 1.

As is the case in FIG. 2, the stator grooves 13 may run in the axial direction, wherein they may run from the first end face B of the stator plate packet 7 to the second end face C of the stator plate packet 7, but also helically or, in a development of a periphery of the stator plate packet 7a, along straight lines oriented obliquely to the rotational axis A of the electrical machine 1 (see the straight line drawn in dotted lines in FIG. 2). The region over which such a stator groove 13 extends is designated with an angle β in FIG. 2. In this case, the angle β corresponds to the pitch of the stator grooves 13, but this is not an essential condition.

It is now advantageous if the angle α is uneven and in particular greater than the angle β. In this way, an undesired reinforcement of the deviation of the central bore of the stator plate packet 7a from the cylindrical form, provoked by a correlation of the weld seams 14 with the stator grooves 13, can be avoided. It is also advantageous if the number n of weld seams is uneven and in particular smaller than a number m of stator grooves 13, as is the case in the example shown in FIG. 2. In this way, an undesired reinforcement of the deviation of the central bore of the stator plate packet 7a from the cylindrical form, provoked by a correlation of the weld seams 14 with the stator grooves 13, can also be avoided.

In the exemplary case depicted in FIG. 2, a turn direction of the helically running weld seams 14 and a turn direction of the helically running stator grooves 13 have the same orientation. This is not however necessarily the case, but a turn direction of the helically running weld seams 14 and a turn direction of the helically running stator grooves 13 may also have opposite orientations.

In the example shown in FIG. 2, there is a slight radial overlap of the weld seams 14 (or a radial overlap of the peripheral regions in which the weld seams 14 run), i.e. the angle α>360°/n. It would however also be conceivable that the weld seams 14 or said regions adjoin one another and the angle α=360°/n, or that the weld seams 14 or said regions are spaced slightly apart from one another and the angle 360°/n>α>360°/n−10%.

There may also be a significantly greater overlap of the weld seams. For example, one weld seam 14 may end at an angular position at which a next-but-one weld seam 14 begins. In other words, for the angle α then α=2·360°/n±10%. For a triple overlap, then even α=3·360°/n±10% and so on.

A further feature of the arrangement shown in FIG. 2 is that the turn directions of all helically running weld seams 14 have the same orientation. This is however also not an essential condition, but the turn directions of the weld seams 14 may also have different orientations. In addition, all weld seams 14 in FIG. 2 are parallel to one another in a development of a periphery of the stator plate packet 7a. This again is not an essential condition, and the weld seams 14 may also run along straight lines which are not parallel to one another.

Figure 3:
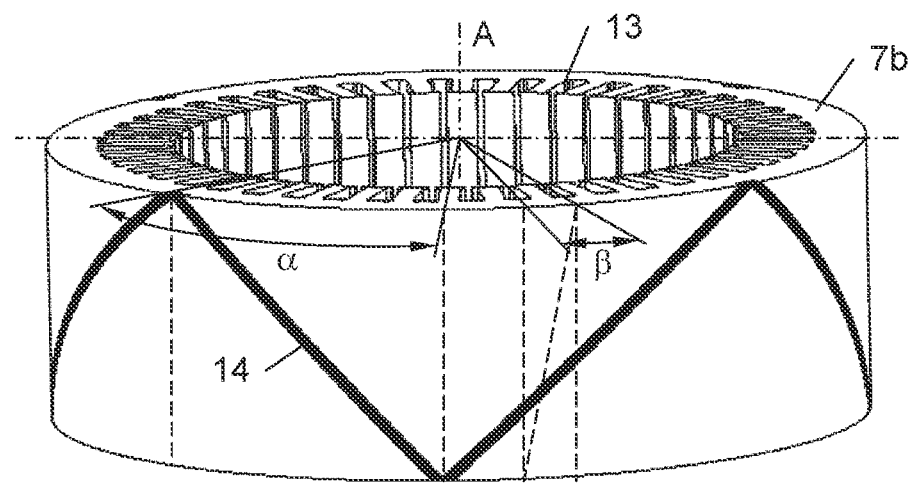
FIG. 3 an oblique view of a stator plate packet welded with arrow-shaped or zigzag weld seams.

FIG. 3 shows for this an oblique view of an exemplary stator plate packet 7b which is similar to the stator plate packet 7a shown in FIG. 2. In contrast to this, a half n/2 of the weld seams 14 has a first turn direction and the other half n/2 of the weld seams 14 has a second opposite turn direction, wherein the number n of weld seams 14 is even. The weld seams 14 thus run in an arrow shape or zigzag shape along straight or helical portions respectively. In the case shown, the weld seams 14 adjoin one another, so the angle $\alpha=360°/n$. The weld seams 14 may also be formed as weld seam portions of a single weld seam 14, wherein the weld seam portions each run from a first end face B of the stator plate packet 7a to a second end face C of the stator plate packet 7a or vice versa. The zigzag course of the weld seam portions offers the advantage that the weld seam 14 can be produced in one step or in a continuous process without repositioning a welding tool. The welding power may be reduced slightly in the corners to avoid burning. For example, the weld seam 14 may be produced with a laser.

It is also pointed out here that the arrow-shaped or zigzag weld seams 14 or weld seam portions do not necessarily run in the circumferential direction but could also run parallel or obliquely to the rotational axis A. The arrow or zigzag pattern is then arranged twisted by 90° or by another angle. The arrow-shaped or zigzag weld seams 14 could again be arranged overlapping one another. In particular, it is again possible that $\alpha=2\cdot360°/n\pm10\%$ or $\alpha=3\cdot360°/n\pm10\%$.

Figure 4:
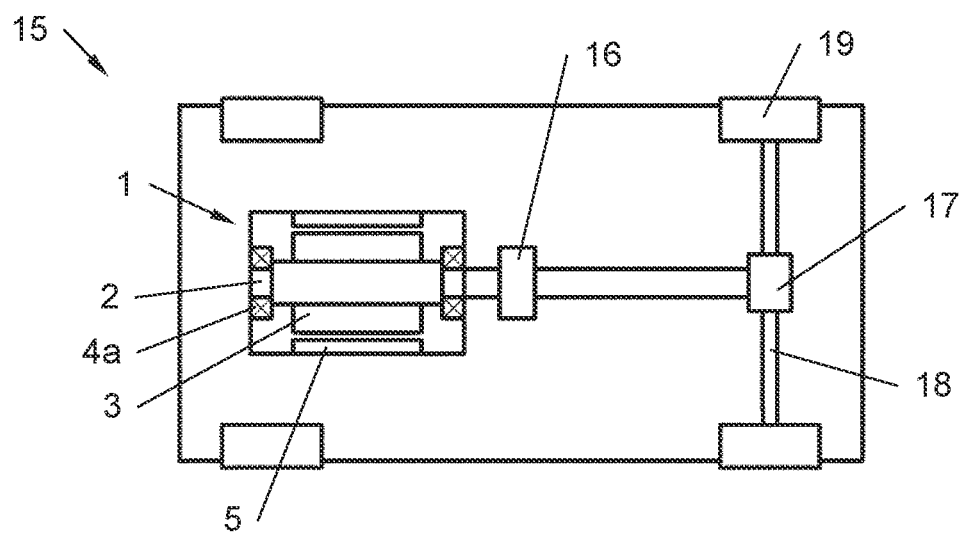
FIG. 4 an electrical machine with a stator of the proposed type, which is installed in a vehicle.

FIG. 4 finally shows an electrical machine 1 installed in a vehicle 15. The vehicle 15 has at least two axles, at least one of which is driven. In concrete terms, the electric motor 1 is connected to an optional gear mechanism 16 and a differential gear 17. The half shafts 18 of the rear axle adjoin the differential gear 17. Finally, the driven wheels 19 are mounted on the half shafts 18. The drive of the vehicle 15 is provided at least partially or for part of the time by the electrical machine 1. This means that the electrical machine 1 may serve for solely driving the vehicle 15, or for example may be provided in conjunction with an internal combustion engine (hybrid drive).

Finally, it is established that the scope of protection is determined by the patent claims. The description and the drawings should however serve as reference for interpretation of the claims. The features contained in the figures may be interchanged and combined with one another arbitrarily. In particular, it is also established that the devices depicted may in reality comprise more or also fewer constituents than illustrated. In some cases, the illustrated devices or their constituents may also not be depicted to scale, and/or may be enlarged and/or reduced.

The invention claimed is:

1. A stator plate packet for a stator of an electrical machine, comprising:
several stator plates stacked one against the other and with stator grooves open towards an inside for receiving a stator winding,
wherein the stator plates are welded together by a plurality of external weld seams or weld seam portions which are evenly distributed over a periphery of the stator plate packet, and
wherein each weld seam or weld seam portion runs from a first end face of the stator plate packet to a second end face of the stator plate packet and wherein, with respect to a rotational axis of the electrical machine, each weld seam or weld seam portion extends over an angle which lies in a range of $\alpha \geq 360°/n-10\%$, wherein n corresponds to a number of external weld seams or weld seam portions comprised by the plurality of external weld seams or weld seam portions, and
wherein the weld seams or weld seam portions run obliquely to the axis of rotation to form a zigzag shape.

2. The stator plate packet according to claim 1, wherein the number n of weld seams or weld seam portions is uneven and less than a number m of the stator grooves.

3. The stator plate packet according to claim 1, characterized in that the angle is uneven and larger than a second angle, over which a helical groove extends from the first end face of the stator plate packet to the second end face of the stator plate packet.

4. The stator plate packet according to claim 1 the number n of weld seams or weld seam portions is even, and a half n/2 of the weld seams have a first turn direction and the other half n/2 of the weld seams have a second, opposite turn direction.

5. The stator plate packet according to claim 1, wherein the weld seams or weld seam portions adjoin one another and the angle $\alpha=360°/n$, or overlap one another and the angle $\alpha>360°/n$, or are slightly spaced apart from one another and the angle $360°/n>\alpha>360°/n-10\%$.

6. An electrical machine comprising:
a stator comprising a stator plate packet with several stator plates with stator grooves which are open towards the inside and which receive a stator winding; and
a rotor mounted so as to be rotatable relative to the stator about the rotational axis of the rotor,
wherein the stator plate packet is configured according to claim 1.

7. A vehicle with at least two axles, of which at least one is driven, wherein said drive is provided at least partially or for part of the time by the electrical machine according to claim 6.

8. The stator plate packet according to claim 1, wherein the weld seams overlap one another.

9. The stator plate packet according to claim 8, wherein the angle $\alpha$ is greater than or equal to $720°/n\pm10\%$.

* * * * *